Sept. 6, 1966  J. B. SIMMONS  3,271,079
PAVEMENT CUTTER
Filed July 18, 1963  4 Sheets-Sheet 1

INVENTOR.
JAMES B. SIMMONS
BY HIS ATTORNEYS
HARRIS, KIECH, RUSSELL & KERN

INVENTOR.
JAMES B. SIMMONS
BY HIS ATTORNEYS
HARRIS, KIECH, RUSSELL & KERN

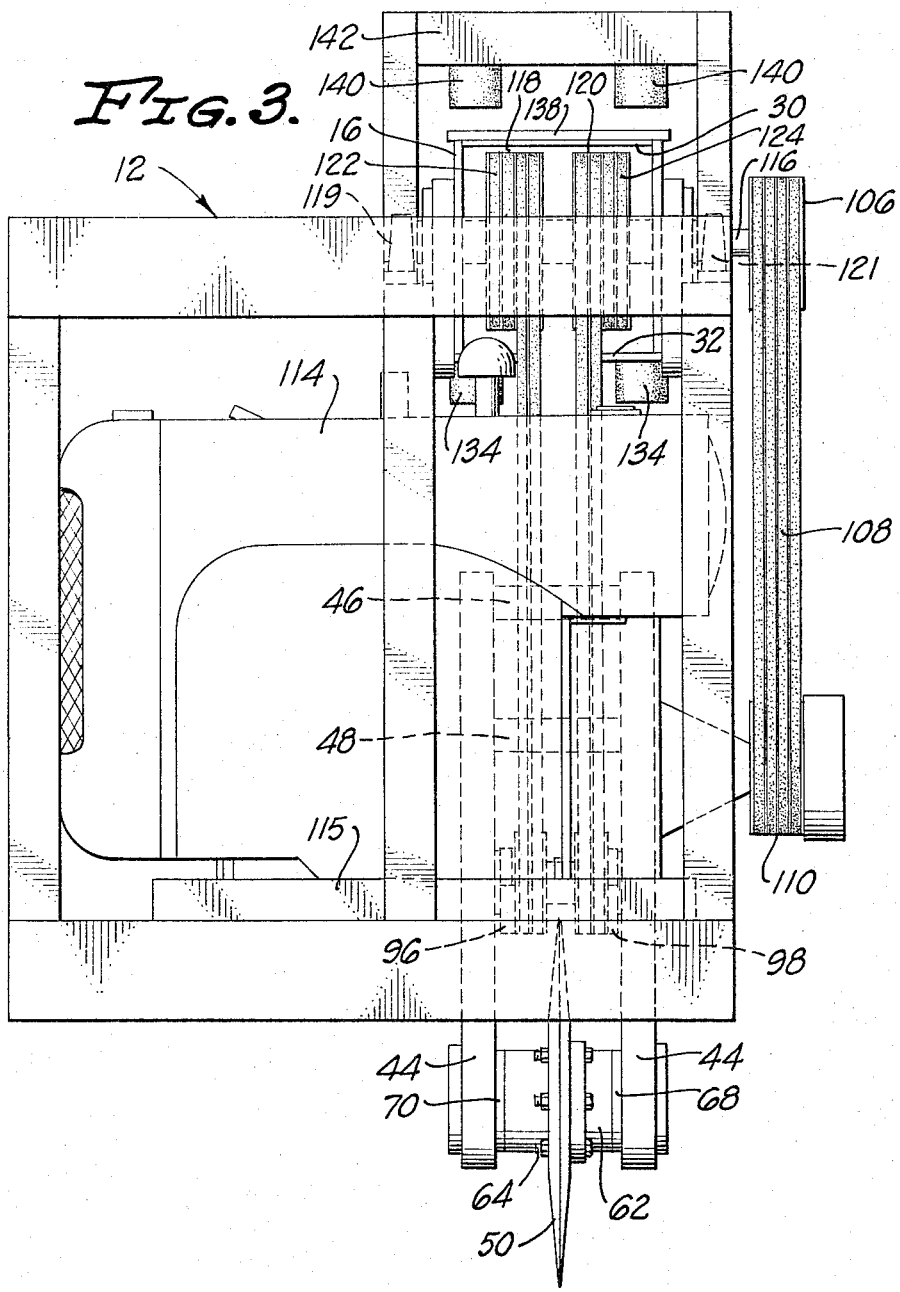

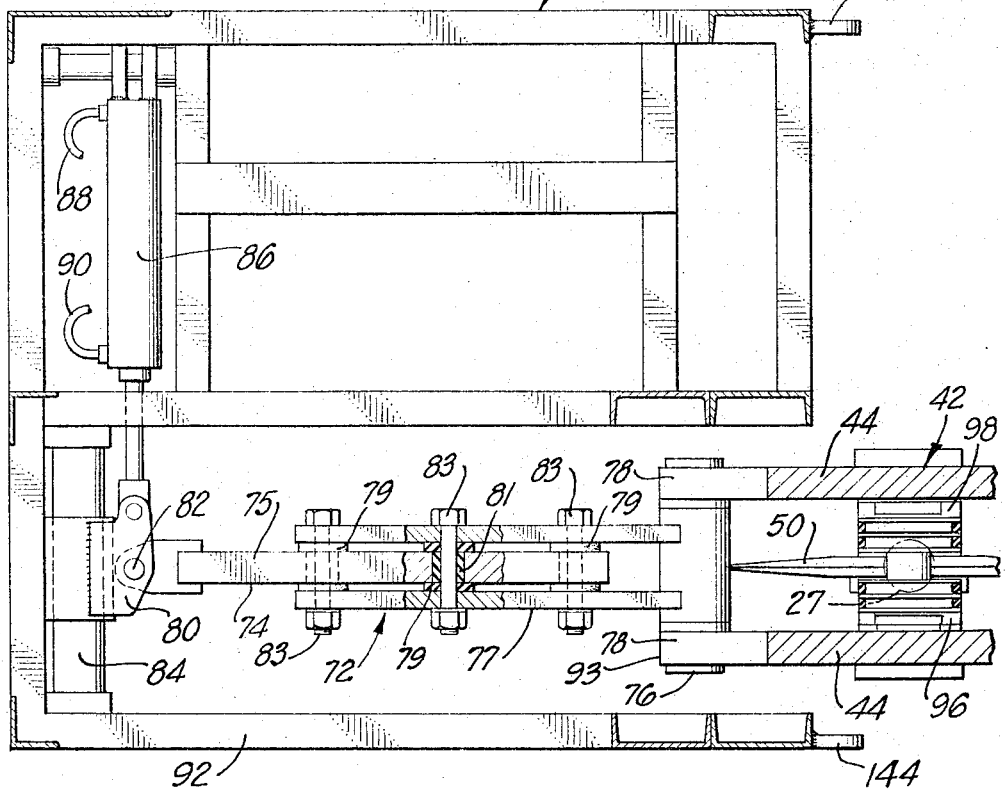
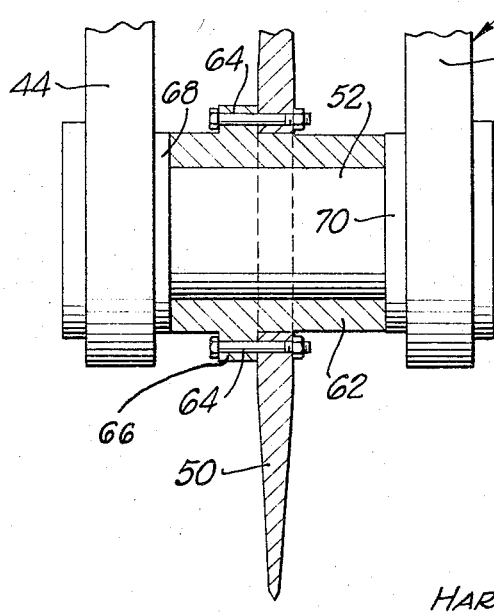

United States Patent Office 3,271,079
Patented Sept. 6, 1966

3,271,079
PAVEMENT CUTTER
James B. Simmons, 12203 Gneiss Ave., Downey, Calif.
Filed July 18, 1963, Ser. No. 295,887
16 Claims. (Cl. 299—40)

This invention relates to a pavement cutter and more particularly to an apparatus especially suitable for cutting asphalt pavement.

Asphalt paved streets and roads are frequently partially excavated to provide a ditch for a pipe line or to gain entrance to an already situated line. In such excavations, a narrow strip of a few feet of the asphalt pavement is removed to permit the digging of a trench lengthwise of the street or road. Conventionally, the asphalt is removed through use of a pneumatic breaker or grader provided with a cutting disc or a stomper, sometimes described as a hydraulic hammer. In some instances, the pavement is cut with a rotary concrete saw. It has proven difficult with the disc attachment to the grader to cut a straight line and provide enough down pressure on the disc to cut relatively thick pavement. The pneumatic breaker and stomper approaches are slow and, being time consuming, are unnecessarily expensive. The use of a rotary saw is also slow and expensive because of the diamond blade that is used.

It is a principal object of the invention to provide an improved apparatus for the cutting of pavement.

It is a still further object of the invention to provide a pavement cutter employing a sharp edged cutting disc to which there is imparted a high frequency vibratory motion.

It is a still further object of the invention to provide a pavement cutter having an improved rate of cutting.

It is another object of the invention to provide a pavement cutter having a separate guide means for the orientation of the cutting member.

It is another object of the invention to provide a pavement cutter employing a sharp edged cutting disc held to the lower end of a pivoted arm and means for imparting a vibratory motion to the cutting disc.

It is another object of the invention to provide a pavement cutting apparatus which is economical to manufacture and is sturdy in construction and efficient in operation.

It is another object of the invention to provide a pavement cutter comprising a frame and an assemblage pivotally connected to the frame made up of a generally horizontally disposed first arm pivotally held at one end to the frame, a downwardly extending, vertically disposed second arm pivotally held to the other end of the first arm, and a sharp edged cutting disc rotatably held to the lower end of the second arm with means for imparting a vibratory motion to the disc.

It is a further object of the invention to provide a pavement cutting apparatus that may be attached to the lift arms of a tractor or separately conveyed by a trailer.

It is a further object of the invention to provide a pavement cutter which has a wide range of cutting speeds.

It is a further object to provide a pavement cutter which permits the following of a straight line with less effort than is possible with most cutters now in use.

The various objects and advantages of the invention will become more apparent in the following detailed description of a preferred practice of the invention considered with the accompanying drawings.

In the drawings:

FIG. 3 is a front elevational view of the pavement cutter of the invention taken from the site of line 3—3 of FIG. 1;

FIG. 4 is a horizontal sectional view of the pavement cutter of the invention taken along line 4—4 of FIG. 1; and FIG. 5 is an enlarged fragmentary sectional view of a rotary cutting disc and its support.

Figure 1:
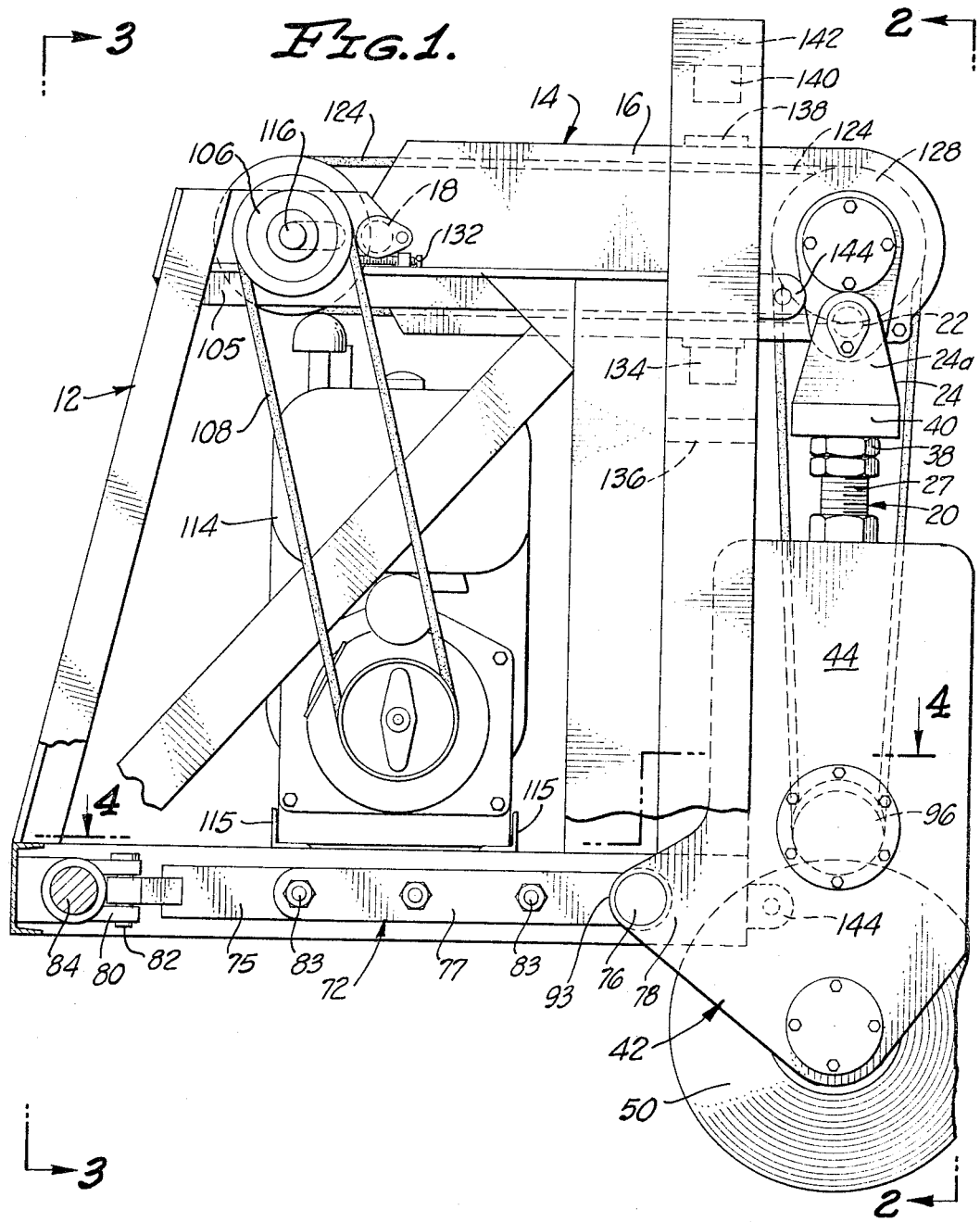
FIG. 1 is a side elevational view, partially cut away, illustrating a preferred embodiment of the pavement cutter of the invention.

The pavement cutter of the invention comprises two main portions: a frame 12 and an assemblage 14 pivotally held to the frame and including a generally horizontally disposed and rearwardly extending first arm 16 which is pivotally held to an upper portion of the frame 12 about a horizontally disposed axle member 18. The first arm 16 at its rearward end pivotally supports a generally vertical second arm 20 about a horizontally disposed axle member 22. More exactly speaking, the second arm 20 is held by a yoke 24 to the first arm 16. Each arm of the yoke 24 is bifurcated to provide two parallel subarms 24a and 24b which straddle a hanger 26 and a side plate 28 of the first arm 16. The hangers 26 are respectively welded to side plates 28 of the first arm 16. The arm 16 at its upper side has an elongated top member 30 joining the two upright side plates 28. A bottom member 32 paralleling the top member 30 closes the underside of the first arm 16, joining together the lower edges of the two side plates 28.

The yoke 24 of the second arm 20 centrally of its width threadedly receives a hanger bolt or king pin 27. The hanger bolt 27 is secured to the yoke 24 by nuts 38 on either side of the yoke cross piece 40. The hanger bolt 27 at its lower end pivotally supports a cutting head sub-assembly 42 made up of two spaced side plates 44, two cross members 46 and 48, and a sharp edged cutting tool in the form of a disc 50 rotatably mounted on a horizontal axle 52 between the two side plates 44. The cutter head assembly 42 is at the rear of the apparatus. It will be seen that the head 54 of the hanger bolt 27 abuts the underside of the cross member 48 while two nuts 56 are turned down on the threads of the bolt into engagement with the upper side of the other cross member 46 of the cutter head assembly 42. With this arrangement of the hanger bolt 27 and the cutting head sub-assembly 42, the latter sub-assembly may be pivoted about a substantially vertical axis running lengthwise of the hanger bolt 27. A spacer bar 58 connects the two side plates 44 centrally of their length and rearwardly of the rotary disc 50.

The rotary disc 50 is provided with a bearing sleeve or collar bushing 62, bolted to the disc by bolts 64 with the disc abutting the collar 66. The disc 50 is substantially flat and when it is desired to replace a disc because of wear, the bearing sleeve 62 is then bolted to a new disc. Two ring spacers 68 and 70 take up the remaining space on the axle 52 between the bearing sleeve 62 and the respective side plates 44 of the cutter head sub-assembly 42.

It has been mentioned that the cutter head sub-assembly 42 and its rotary disc 50 may be pivoted about a substantially vertical axis, this being achieved by a pivoting means 72 which includes (see FIGS. 1 and 4) an elongated, resilient link 74 which is pivotally connected at its rearward end about an axle 76 disposed between forwardly reaching ears 78 of the side plates 44 of the cutter head sub-assembly 42. The axle 76 in the position of FIGS. 1 and 4 parallels axle members 18 and 22 of the upper first arm 16. The other end of the link 74 is pivotally connected to a carriage 80 about a substantially vertical axis 82. The carriage 80 is movable from its position illustrated in FIGS. 1 and 4 along a track 84 by a hydraulic piston-cylinder assembly 86. The flow of hydraulic fluid to and from the piston-cylinder assembly 86 is via lines 88 and 90. With movement of the carriage 80 toward a frame side member 92, there occurs a pivoting of the cutter head sub-assembly 42 about the hanger bolt 27 and a movement of the forward end 93 of the sub-assembly towards the frame side member 92. With movement of the carriage towards the piston-cylinder assembly 86, the forward end 93 of the cutter head assembly 42 moves away from the frame side member 92 (see FIG. 4).

The elongated link 74 comprises a first single arm portion 75 which is resiliently coupled to a second two-arm portion 77 through a resilient coupling made up of six rubber washers 79 and three rubber, tubular bushings 81 which bushings encircle three bolts 83. With this arrangement, there is no metal-to-metal contact within the resilient coupling. The rubber washers 79 and the rubber bushings 81 substantially absorb the forward and backward motion imparted to the cutter head sub-assembly 42 with the result little motion is transferred to the frame 12 via the elongated link 74. Similarly, the assemblage 14 which is pivotally held to the frame 12 substantially precludes the transfer of the up and down motion to the frame 12.

The cutting of asphalt pavement and the like is achieved by imparting a high frequency up-and-down and forward-and-backward or vibratory motion to the second arm 20. More precisely, this is achieved in the embodiment of the drawing by an off-center mass which is rotatably held to the cutter head sub-assembly 42. In the particular embodiment illustrated, the off-center mass takes the form of eccentrically weighted sheaves 96 and 98 which are mounted on an axle 100 extending between the two side plates 44 of the cutter head sub-assembly 42. The two off-center mass sheaves 96 and 98 are driven respectively through belt drive systems 102 and 104 connected via intermediate pulleys and belts to a pulley 106 rotatably mounted upon an upper short and horizontally disposed structural member 105 of the frame 12 at the forward side of the pavement cutter. The two eccentric sheaves 96 and 98 are so disposed that they impart both an up-and-down motion as well as a forward-and-backward motion to the cutting head sub-assembly 42. It would be possible to arrange and operate the eccentric sheaves to impart a vibratory motion having only an up-and-down motion and no forward-and-backward motion, but this is the less desirable manner of operating the cutter head sub-assembly 42.

The magnitude of the vibratory motion is desirably not large, being for example only ⅛ of an inch or so. The desired frequency of the vibratory motion will vary considerably depending, among other things, on the particular pavement cutter, its weight, and the roadbed being cut.

Figure 2:
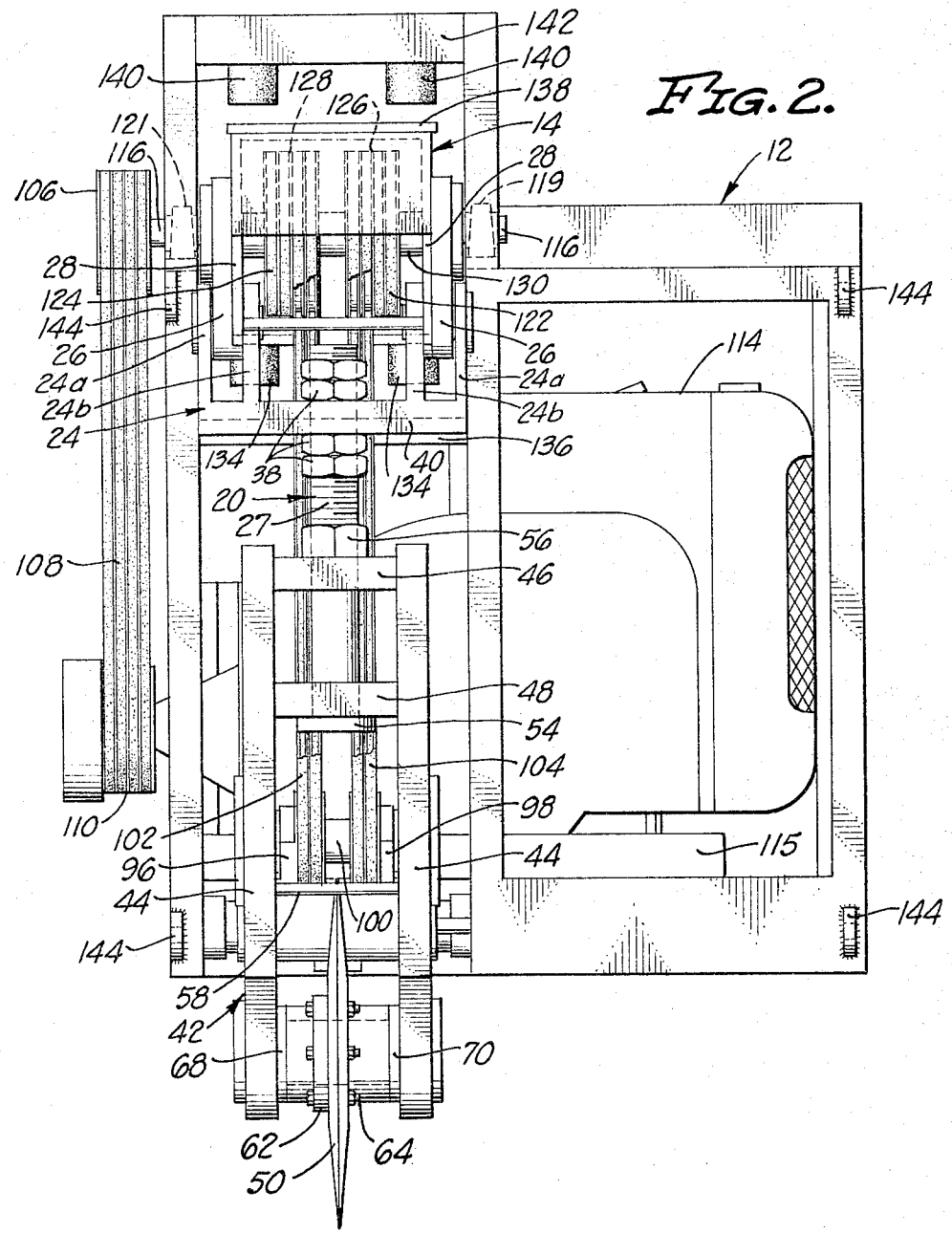
FIG. 2 is a rear elevational view of the pavement cutter of the invention taken from the site of line 2—2 of FIG. 1.

Referring to FIG. 2, it will be seen that the pulley 106 is driven via a V-belt 108 and a drive pulley 110 mounted on the drive shaft of an engine 114. The engine 114 is supported on lower cross members 115 of the frame 12. The driven pulley 106 is mounted on a horizontally disposed shaft 116 and carries two spaced drive pulleys 118 and 120. The shaft 116 is supported by spaced pillow blocks 119 and 121. The pulleys 118 and 120 on shaft 116 are connected respectively via belts 122 and 124 to pulleys 126 and 128 supported by a shaft 130 at the rearward end of the first arm 16. The vertical belts 102 and 104 are driven by pulleys 126 and 128 respectively and in turn rotate the off-balance sheaves 96 and 98. The off-balance sheaves 96 and 98 impart a vibratory or high frequency up-and-down and forward-and-backward motion to the assemblage made up of the generally horizontally disposed first arm 16, the generally vertically disposed second arm 20, and the rotary cutting disc 50.

Tensioning of the belts 102 and 104 may be adjusted through adjustment of the nuts 38 along the threaded length of the hanger bolt 27. The tensioning of the belts 122 and 124 is had by resetting an adjustment screw 132 associated with shaft 116 at the forward side of the apparatus.

With the elevation of the frame 12 from the position shown in the drawings, there will be a relative dropping or lowering of the assemblage made up of the first arm 16 and the second arm 20 including the cutter head sub-assembly 42. The underside of the first arm 16 is provided with hard rubber bumpers 134 which with the lowering of the first arm 16 will strike a limiting cross piece 136 of the frame 12. In a similar fashion, the upper side of the first arm 16 carries a striker plate 138 which with elevation of the first arm 16 will strike two hard rubber bumpers 140 carried by the underside of a super structure 142 of the frame 12.

The pavement cutter of the invention may be carried by the lift arms of a tractor through the use of four hangers 144 located at the corners of the rear side of the apparatus (see FIG. 2). The pavement cutter of the invention may be mounted on a trailer and pulled behind a source of power.

Although an exemplary embodiment of the invention has been disclosed herein for purposes of illustration, it will be understood that various changes, modifications, and substitutions may be incorporated in such embodiment without departing from the spirit of the invention as defined by the claims which follow.

I claim:

1. In a pavement cutter, the combination of:
a frame;
an assemblage pivotally connected to the frame, said assemblage including a generally horizontally disposed first arm pivotally held about a horizontal axis at one end thereof to the frame, said horizontal axis being transverse to said first arm, a generally vertically disposed second arm pivotally connected to the other end of the first arm about a horizontally disposed axis, and a sharp edged disc rotatably held to the lower end of the second arm about a generally horizontal axis;
means for pivoting the rotary cutting disc about a substantially vertical axis; and
means for imparting a vibratory motion to the cutting disc.

2. In a pavement cutter, the combination of:
a frame;
an assemblage pivotally connected to the frame, said assemblage including a generally horizontally disposed first arm pivotally held at one end to the frame, the other end of the first arm having limited vertical movement relative to the frame, a generally vertically disposed second arm pivotally connected to the other end of the first arm and including a cutting head held to the lower end of the second arm and pivotally connected thereto about a substantially vertical axis, said cutting head including a sharp edged cutting tool rotatably held about a horizontal axis;
means for pivoting the cutting head about said substantially vertical axis; and
means for imparting a high frequency up-and-down and forward-and-backward motion to said cutting head.

3. In a pavement cutter, the combination of:
a frame;
an assemblage pivotally connected to the frame, said assemblage including a generally horizontally disposed first arm pivotally held about a horizontal axis at one end thereof to the frame, the other end of the first arm having limited vertical movement relative to the frame, a generally vertically disposed second arm pivotally connected to the other end of the first arm for movement about a vertically disposed axis and including a sharp edged cutting tool at the lower end of the second arm; and means for imparting a high frequency up-and-down and forward-and-backward motion to said cutting tool.

4. In a pavement cutter, the combination of:

a frame;

an assemblage including a substantially vertical arm pivotally mounted on the frame for limited movement relative thereto, and a sharp edged disc rotatably held about a horizontal axis to the lower end of the arm and movable about a vertical axis;

means for imparting a vibratory motion to the assemblage, said means including a rotatable off-center mass rotatably held to the assemblage; and means for pivoting the cutting disc about its substantially vertical axis.

5. In a pavement cutter, the combination of:

a frame;

an assemblage pivotally connected to the frame, said assemblage including a generally horizontally disposed first arm pivotally held about a horizontal axis to one end thereof to the frame, a generally vertically disposed second arm pivotally connected to the other end of the first arm about a horizontally disposed axis and including a cutting head comprising the lower end of the second arm and pivotally connected about a substantially vertical axis, said cutting head including a sharp edged disc rotatably supported about a substantially horizontal axis;

means for pivoting the cutting head about the substantially vertical axis, said means including an arm pivotally held to the cutting head about a horizontal axis with the other end of the arm being pivotally held about a vertical axis to a carriage that is movable in a horizontal plane paralleling the axes of the first and second arms, and means for moving said carriage; and means for imparting a vibratory motion to the cutting disc.

6. In a device for cutting asphalt pavement and the like, the combination of:

a framework for mounting on a vehicle;

a cutting disc for operative engagement with a work surface, said disc being rotatably mounted on an axle member supported by the framework for vibratory movement of the cutting disc relative to the framework in a plane substantially normal to said axle member, the axle member also being supported for limited pivotal movement of the cutting disc relative to the framework about an axis substantially normal to such a work surface;

means supported on the framework for vibrating the cutting disc; and means supported on the framework for pivoting the cutting disc relative to said framework.

7. In a pavement cutter, the combination of:

a framework;

a depending, elongated hanger arm with a longitudinally extending axis having the upper end thereof supported by the framework;

a cutter head assembly mounted adjacent the lower end of the hanger arm for pivotal movement about said longitudinally extending axis;

a cutting disc rotatably supported in said cutter head assembly for vibratory movement in a plane which is substantially parallel to the longitudinal axis of the hanger arm;

an elongated pivoting arm extending transversely of the hanger arm and having one end thereof connected to the cutter head assembly and the other end supported on the framework for limited movement relative to said framework for pivoting said cutter head assembly about said longitudinally extending axis;

means for controlling the movement of the framework end of the pivoting arm; and means for vibrating said cutting disc.

8. A pavement cutter as set forth in claim 7 in which the pivoting arm includes resilient means providing for limited flexing of said pivoting arm.

9. A pavement cutter as set forth in claim 7 which includes shock absorbing means associated with the pivoting arm preventing the direct transmission of mechanical vibrations from the cutter head assembly through the pivoting arm and to the framework.

10. A pavement cutter as set forth in claim 7 in which the pivoting arm includes a plurality of overlapping elongated members with resilient, shock-absorbing elements therebetween to provide limiting flexing of said pivoting arm and prevent the direct transmission of mechanical vibrations from the cutter head assembly through the pivoting arm and to the framework.

11. In a pavement cutter, the combination of:

a framework;

a depending, elongated hanger arm with a longitudinally extending axis having the upper end thereof supported by the framework;

a cutter head assembly mounted at the lower end of the hanger arm and containing a cutting disc rotatably supported therein;

a weight member mounted in the cutter head assembly above the cutting disc for rotation about an axis which is offset from the center of gravity of said weight member, the axis of the weight member being substantially normal to the longitudinally extending axis of the hanger arm; and driving means mounted on the framework for rotating the weight member about its axis to cause the cutter head assembly and the cutting disc to vibrate.

12. In a pavement cutter, the combination of:

a framework;

a depending, elongated hanger arm with a longitudinally extending axis having the upper end thereof supported by the framework for limited movement of said upper end relative to the framework substantially along said longitudinally extending axis;

a cutter head assembly mounted adjacent the lower end of the hanger arm for pivotal movement about said longitudinally extending axis;

means supported on the framework for controlling the pivotal movement of the cutter head assembly;

a cutting disc rotatably supported in the cutter assembly;

vibrating means associated with the cutter head assembly; and means supported on the framework for actuating said vibrating means.

13. A pavement cutter as set forth in claim 12 which includes means associated with the framework for applying a force to the hanger arm and the cutting disc along the longitudinally extending axis of said arm.

14. In a pavement cutter, the combination of:

a framework;

a transversely extending first arm having one end thereof pivotally connected to the framework;

a depending elongated hanger arm with a longitudinally extending axis having the upper end thereof pivotally connected to the other end of said first arm to provide for limited movement of the upper end of said hanger arm;

a cutter head assembly mounted at the lower end of the hanger arm for pivotal movement about said longitudinally extending axis;

a cutting disc rotatably supported in said cutter head assembly;

an elongated pivoting arm extending between the cutter head assembly and the framework, the framework end of the pivoting arm being mounted for limited transverse movement relative to the framework to pivot said assembly;

means associated with the cutter head assembly for vibrating said assembly and the cutting disc supporter therein; and means mounted on the framework for actuating said vibrating means.

15. A pavement cutter as set forth in claim 14 which includes means associated with the framework for applying a force to the hanger arm and the cutting disc along the longitudinally extending axis of said arm.

16. A pavement cutter as set forth in claim 15 in which the means for actuating the vibrating means includes rotary means mounted on the framework and endless belt means extending along said first arm and said hanger arm.

References Cited by the Examiner

UNITED STATES PATENTS

| | | | |
|---|---|---|---|
| 1,196,549 | 8/1916 | Krotz | 172—666 X |
| 1,614,273 | 1/1927 | Brewer. | |
| 1,963,700 | 6/1934 | Heltzel | 94—48 X |
| 2,874,948 | 2/1959 | Bjorkman et al. | 299—37 |
| 3,038,397 | 6/1962 | Middlestadt | 94—48 X |

ERNEST R. PURSER, *Primary Examiner.*

JACOB L. NACKENOFF, *Examiner.*